Feb. 17, 1931.  L. MARX  1,792,851
TOY EXCAVATOR
Filed Dec. 18, 1926
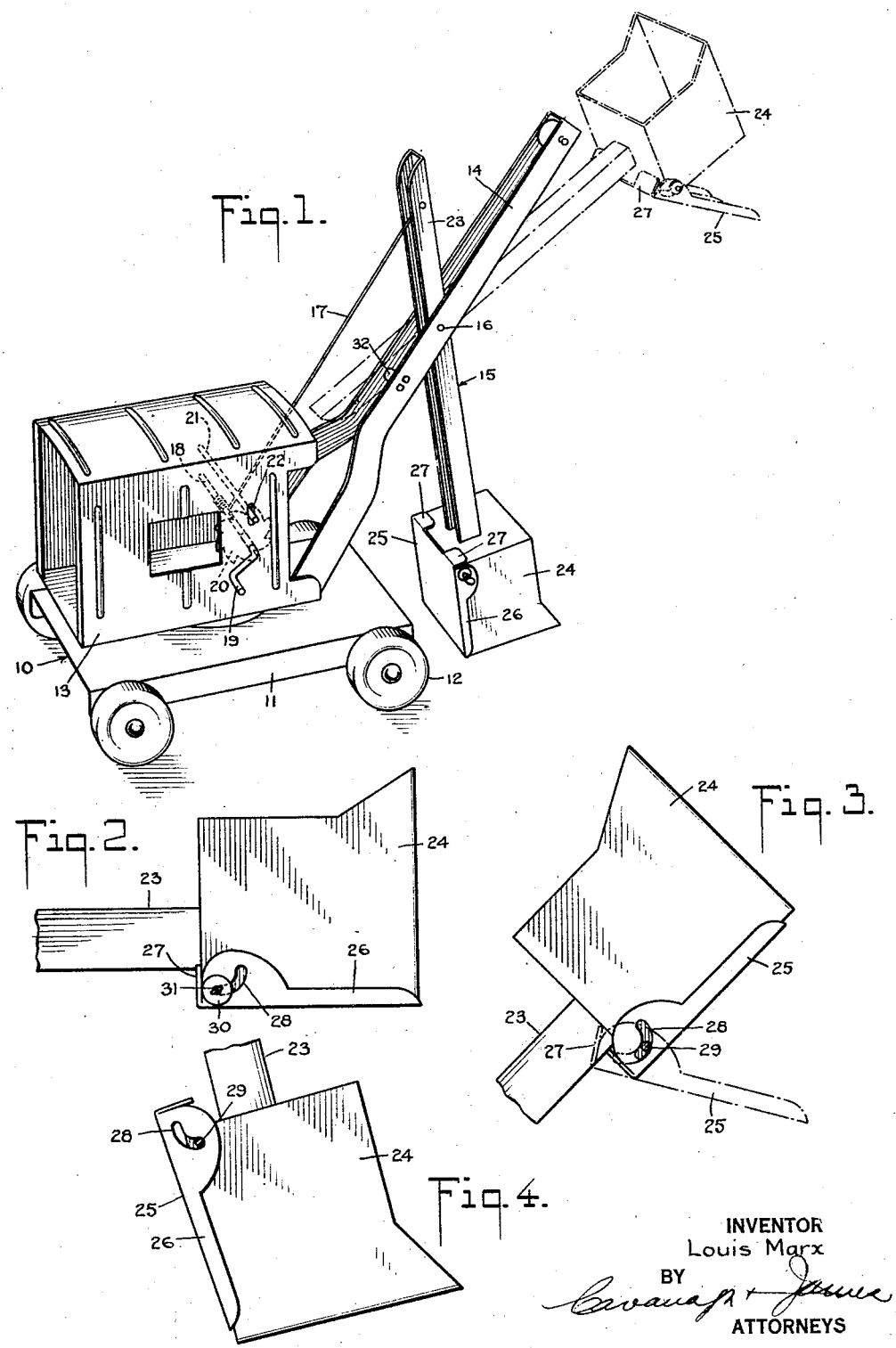
INVENTOR
Louis Marx
BY
ATTORNEYS Patented Feb. 17, 1931

1,792,851

UNITED STATES PATENT OFFICE

LOUIS MARX, OF BROOKLYN, NEW YORK

TOY EXCAVATOR

Application filed December 18, 1926. Serial No. 155,589.

This invention relates to a toy excavator or steam shovel crane and its principal object is to provide a novel and useful toy which shall be readily operable by a child, and which shall contain few elements which are likely to get out of order.

Toy steam shovels generally comprise a truck, a swivel cabin mounted on said truck, a mast supported on said cabin, and a shovel fulcrumed on the mast. The shovel has a scoop at one end which is provided with a trap door.

The present invention relates more particularly to the relation of the trap door to the scoop, and to the manner of operating the trap door.

In the toy steam shovels known hitherto, various means were provided for the operation of the trap door, all of which depended upon the use of movable latching means of one type or another, and upon the use of strings and wires which are attached either to the latching means or to the trap door for operating the same. Such structures introduce movable parts and parts which may break, tear or otherwise become inoperative, with the result that such toys become inoperative and useless due merely to the failure of the latch or the latch operating means. It is the object of the present invention to minimize the number of movable parts in a toy steam shovel, and more particularly to eliminate the latch and latch operating means which are associated with the trap door in the toy steam shovels known hitherto.

In the present invention the above objects are accomplished by pivotally mounting the trap door on the scoop in such a manner that the trap door automatically closes when the shovel is lowered to its loading position, and the trap door automatically opens when the shovel is raised to its discharge position. These ends are accomplished without the use of any parts extraneous to the scoop and trap door, and the device operates automatically.

The invention further consists in the several novel features that are set forth hereinafter in the appended claims.

In the drawings, Fig. 1 shows a toy steam shovel embodying the present invention.

Figs. 2, 3 and 4 are detailed illustrations of the manner of mounting and operation of the trap door.

Referring to the drawings, 10 designates the truck or running gear which comprises a platform 11 mounted upon the wheels 12. The superstructure shown in the drawings is mounted upon the platform 11 and is swiveled thereto in a manner well known in the art, the superstructure comprising a cabin or other enclosure 13, a mast 14 and a shovel 15 fulcrumed on the mast 14 at the point 16. A rope 17 is attached to the upper end of the shovel 15 at one end thereof, and is attached to the rotatable shaft 18 which is mounted transversely in the housing 13 and is provided at one end thereof with a manually operable crank 19. Rotation of the shaft 18 in one direction raises the shovel 15 to the dotted line position shown in Fig. 1 and rotating the shaft 18 in the opposite direction lowers the shovel to the full line position shown in Fig. 1. The transverse bar 32 serves to limit the operable movement of the shovel. In order to hold the shovel in any desired position, the shaft 18 carries a ratchet 20 which cooperates with a rod 21 to hold the shovel in any desired position. The rod 21 is movable vertically at one end thereof in the slot 22, thereby providing means for releasing the ratchet from engagement with the rod 21 and making it possible to rotate the shaft 18 in the opposite direction so as to permit free lowering of the shaft.

The exact construction of the parts thus far described is immaterial to the subject matter of the present invention, and such construction may be varied in any manner desired.

The shovel 15 comprises the arm 23 and the scoop 24 which is provided with a trap door 25 designed to permit the discharge of the scoop. In the toy steam shovels known hitherto, the operation of the trap door was controlled by latches which were movably mounted on the shovel arm 23, which in turn had to be operated by strings. The mere breaking of such strings frequently destroyed the usefulness of the toy for the child. In the present invention, therefore, the trap door is so mounted on the scoop that the use of any latches and strings is entirely eliminated, the entire operation of the trap door being effected by the manner of mounting of the trap door on the scoop, the operation being thereby made automatic, so that when the shovel is raised from the full line position shown in Fig. 1 to the dotted line position shown in Fig. 1, the trap door remains closed during its course of travel, but opens automatically as soon as it reaches the dotted line position, thus permitting the proper discharge of the load in the scoop at the proper point and at the proper time, and obviating any premature discharge of the load. Conversely, when the shovel is lowered from its dotted line position to the full line position shown in Fig. 1, the trap door is closed as soon as the shovel reaches its loading or full line position.

The trap door, which is preferably stamped out of sheet metal, comprises the longitudinal flanges 26 which embrace the lower longitudinal edges of the side faces of the scoop when the trap door is in its closed position. The trap door is also provided with the lugs 27 which serve to limit the opening movement of the trap door 25, as will be seen in the dotted line position in Figs. 1 and 3.

Each of the flanges 26 is provided with an arcuate slot 28 which serves to receive the pivot pin 29 which passes through the sides of the scoop 24. Small metallic washers 30 are preferably mounted on each end of the pin 29 and serve to limit the lateral movement of the trap door, and the washers 30 are held in place by providing flattened portions 31 on the ends of the pin 29.

It will be seen that the arcuate slot 28 has a horizontal portion and a vertical portion at the forward end thereof. It is the cooperation of the slot 29 with the stop lugs 27 which bring about the automatic operation of the trap door, as described above. Starting with the position as shown in full lines in Fig. 1, it will be seen that the trap door is closed against the scoop and so positioned that the pin 29 is disposed in the rearmost end of the arcuate slot 28, and the flanged lugs 27 abut against the rear face of the scoop. As the shovel is raised, this relationship between the trap door and the scoop 24 remains undisturbed until after the shovel has passed the horizontal position shown in Fig. 2. In this position the trap door is prevented from opening by the engagement of the stops 27 against the rear face of the scoop. When, however, the shovel is raised to the dotted line position shown in Fig. 1 or to the full line position shown in Fig. 3, gravity causes the trap door to slide to the full line position shown in Fig. 3. This, it will be seen, releases the engagement between the lugs 27 and the rear face of the scoop, and the trap door is now free to move on the pin 29 to its open position. The opening movement of the door is limited by the subsequent engagement of the upper edges of the lugs 27 with the rear face of the scoop 24. At the same time the slot 28 travels over the pin 29 until the pin 29 abuts up against the forward end of the slot.

When the shovel is lowered from the dotted line position to the full line position shown in Fig. 1, the operation described above is reversed. When the shovel reaches the full line position shown in Figs. 1 and 4, gravity forces the trap door to close the scoop first into the position shown in Fig. 4, this being immediately followed by the downward sliding of the trap door 25 to the full line position shown in Fig. 1.

Considerable variation of the details of construction is possible without departing from the spirit of this invention. I therefore desire not to limit myself to the form of construction shown and described hereinabove.

I claim:

1. In a toy excavator, a scoop section movable from a loading position to a discharge position, a trap door for the discharge opening of said scoop, the trap door comprising a body portion for closing the discharge opening of the scoop, a pair of lateral flanges having arcuate slots for pivotally mounting the door on the scoop and an upwardly extending flange on the rear of said door for engaging the rear face of the scoop.

2. In a toy excavator, a scoop section movable from a loading position to a discharge position, a trap door for the discharge opening of said scoop; co-operating mechanism mounted on said scoop and on said trap door for movably supporting the trap door on the scoop, said mechanism being operative for effecting a trap door movement longitudinally and pivotally with relation to the scoop to open and close the same.

3. In a toy excavator, a scoop section movable from a loading position to a discharge position, a trap door for the discharge opening of said scoop, the trap door having slotted lateral flanges cooperating with the pivot pin mounted on the scoop to provide pivotal movement of the door, and having another flange which serves to hold the door in the closed position and to limit the opening movement of the door.

4. In a toy excavator, a scoop section movable from a loading position to a discharge position, a trap door for the discharge opening of said scoop, the trap door having flanges provided with arcuate slots cooperating with the pivot pin mounted on the scoop to provide pivotal movement of the door, and having another flange which serves to hold the door in the closed position and to limit the opening movement of the door.

5. In a toy excavator, a scoop section movable from a loading position to a discharge position, a trap door for the discharge opening of said scoop, mechanism for movably mounting said trap door on said scoop, said mechanism comprising pivot means on said scoop and a part on said trap door having an elongated slot means receiving said pivot means, said mechanism being operative so that the trap door automatically closes when the scoop is in the loading position and automatically opens when the scoop is in the discharge position.

6. In a toy excavator, a scoop section movable from a loading position to a discharge position, a trap door for the discharge opening of said scoop, mechanism for movably mounting said trap door on said scoop, said mechanism comprising pivot means on said scoop and a part on said trap door having an elongated slot means receiving said pivot means, said mechanism being operative so that the trap door automatically closes when the scoop is in the loading position and automatically opens when the scoop is in the discharge position, and means cooperating with said mechanism for locking the trap door in closed position when the scoop is in loading position and for permitting the trap door to open when the scoop is in the discharge position.

7. In a toy excavator, a scoop movable from a loading position to a discharge position, a trap door for the discharge opening of said scoop, mechanism for movably mounting said trap door on said scoop, and additional means cooperating with said mounting mechanism and operative for effecting the opening of the trap door solely under the influence of gravity when the scoop is in the discharge position.

8. In a toy excavator, a scoop movable from a loading position to a discharge position, a trap door for the discharge opening of said scoop, mechanism for movably mounting said trap door on said scoop, and additional means cooperating with said mounting mechanism and operative solely under the influence of gravity both for closing the trap door when the scoop is moved to the loading position and for opening the trap door when the scoop is moved to the discharge position.

9. In a toy excavator, a scoop movable from a loading position to a discharge position, a trap door for the discharge opening of said scoop, mechanism for movably mounting said trap door on said scoop, and additional means cooperating with said mounting mechanism and operative solely under the influence of gravity for automatically closing and locking the trap door when the scoop is moved to the loading position and for automatically releasing the trap door for movement to an open position when the scoop is moved to the discharge position.

10. In a toy excavator, a scoop movable from a loading position to a discharge position, a trap door for the discharge opening of said scoop, means for movably mounting said trap door on said scoop, and means cooperating with said mounting means and operative solely under the influence of gravity for automatically closing and locking the trap door when the scoop is moved to the loading position and for automatically releasing the trap door and limiting its movement to an open position when the scoop is moved to the discharge position.

Signed at New York city in the county of New York and State of New York this 15th day of December, A. D. 1926.

LOUIS MARX.